United States Patent [19]
Laner

[11] 3,841,355
[45] Oct. 15, 1974

[54] PIPE PLUGGING TOOL

[76] Inventor: Gary J. Laner, Rt. 1, Box 250, Wagoner, Okla. 74467

[22] Filed: June 16, 1972

[21] Appl. No.: 263,591

[52] U.S. Cl.................................. 138/89, 138/93
[51] Int. Cl............................................ F16l 55/12
[58] Field of Search.............. 138/89, 93, 94, 90, 97

[56] References Cited
UNITED STATES PATENTS

| | | | |
|---|---|---|---|
| 827,835 | 8/1906 | White .................................. | 138/93 |
| 2,177,916 | 10/1939 | Thomas et al. ....................... | 138/90 |
| 2,264,822 | 12/1941 | Ahern .................................. | 138/93 |
| 2,309,429 | 1/1943 | Ahern .................................. | 138/93 |
| 2,399,544 | 4/1946 | Danner ................................ | 138/93 |
| 2,867,243 | 1/1959 | Bowan ................................. | 138/89 |
| 2,924,246 | 2/1960 | Markel ................................. | 138/89 |
| 3,022,801 | 2/1962 | Petersen .............................. | 138/89 |
| 3,032,069 | 5/1962 | Ficklin ................................. | 138/89 |
| 3,173,449 | 3/1965 | Custer et al. ........................ | 138/93 |
| 3,564,103 | 2/1971 | Brachschob et al. ............. | 138/93 X |
| 3,704,729 | 12/1972 | Tomlinson ........................... | 138/90 |

*Primary Examiner*—Charles A. Ruehl
*Attorney, Agent, or Firm*—William S. Dorman

[57] ABSTRACT

An expandable pipe plugging tool for plugging off fluid flow through a pipe upstream of a valve to facilitate maintenance or replacement of the said valve with substantially no fluid loss. The said pipe plugging tool comprises a pipe section having one open threaded end and one closed end, the said closed end having a centrally disposed aperture therethrough, an elongated hollow tool rod slidably disposed within the aperture, sealing means interposed between the aperture and the tool rod, an expandable plug member secured to one end of the tool rod and slidably disposed within the pipe section, and operator means operably connected between the expandable plug member and the opposite end of the tool rod for expansion of the said plug member. The valve removal is accomplished by closing the valve, threadedly attaching the pipe section to the valve outlet port, opening the valve and passing the expandable plug member through the open valve and into the pipe upstream of the valve. The expandable plug member is then expanded to close the said pipe and the pipe section and valve are then removed leaving the plug member and tool rod in place. Reinstallation of the valve is accomplished by the reversal of the above steps.

6 Claims, 5 Drawing Figures

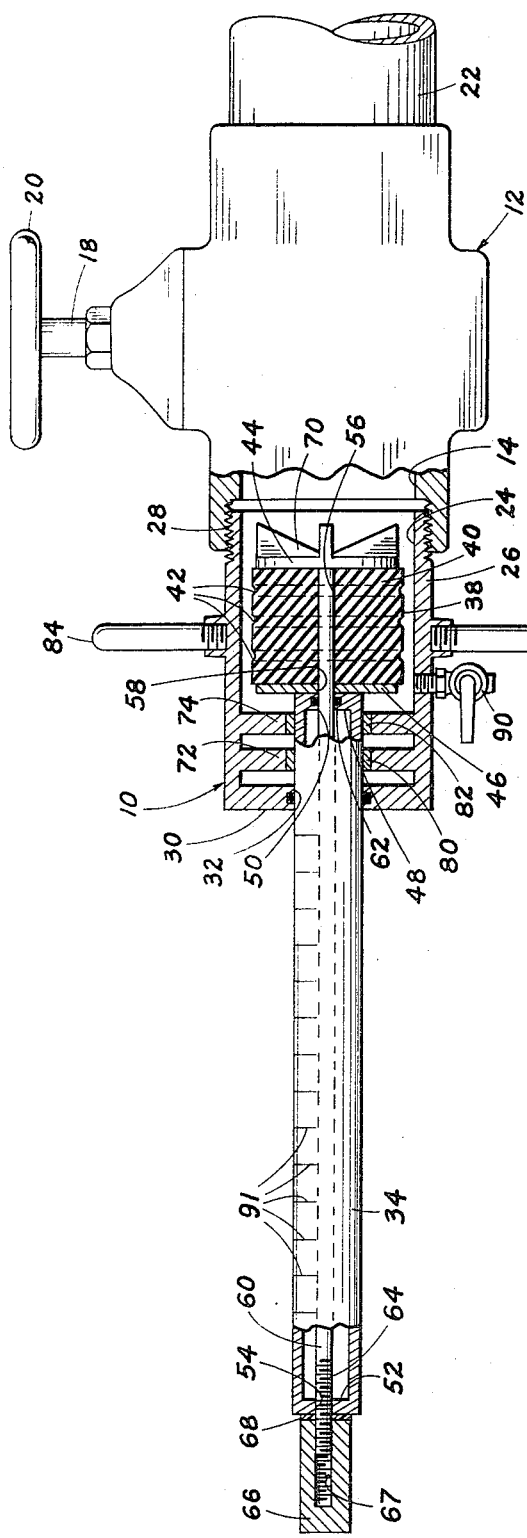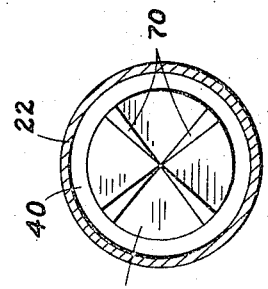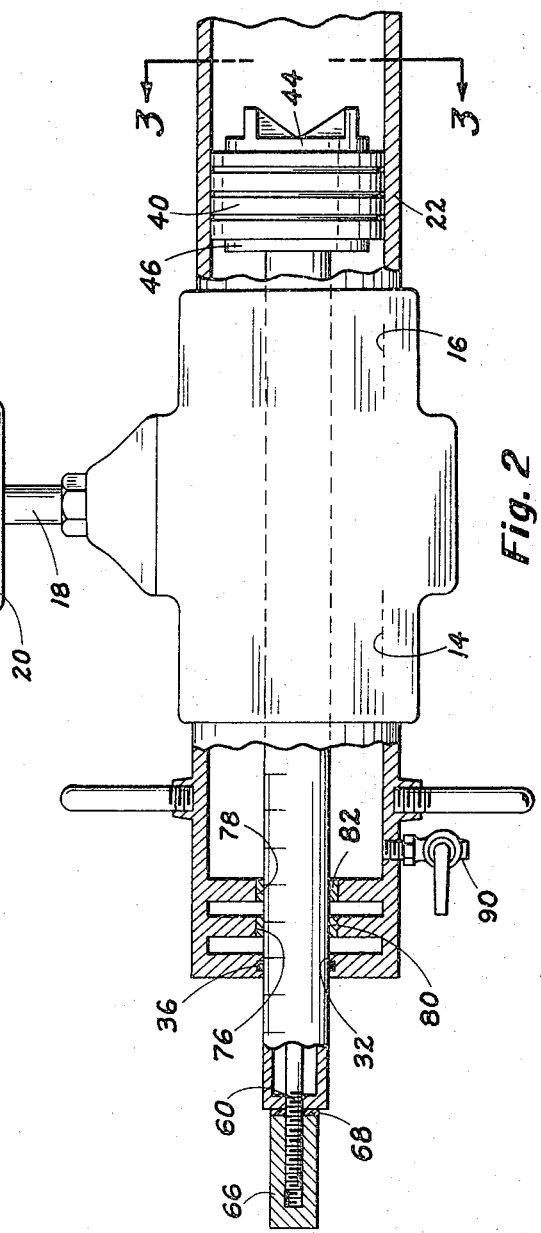

3,841,355

PIPE PLUGGING TOOL

BACKGROUND OF THE INVENTION

1. Field of the Invention

This invention relates to method and means for plugging off fluid flow in a pipe and more particularly, but not by way of limitation, to an expandable pipe plugging tool, particularly designed and constructed for plugging off fluid flow in a pipe upstream of a valve to facilitate maintenance or replacement of the said valve with substantially no fluid loss.

2. Description of the Prior Art

Normally, when maintaining or replacing a valve at the base of oil reservoir tank, it is necessary to empty the said tank before removing the valve to prevent the excessive spillage of flamable fluids stored in the reservoir tank. It is readily apparent that this is a very expensive and time consuming operation. Other methods have been used, such as tapping into the pipe upstream from the valve and installing a new valve at that point, plugging the pipe between the two valves and just letting the old valve remain at the end of the plugged pipe. This method also has many disadvantages, one being that of drilling into or cutting into a pipe containing flamable fluids, thereby creating a hazardous condition. One of the solutions to this problem is proposed in the patent to Petersen, application Ser. No. 3,022,801 issued in 1962 and entitled "ValveTraversing Pipe Stopper Assembly," but has the disadvantage of failing to provide proper sealing within the operator shaft for the plug and further providing a smooth type plug member which would require the application of extreme pressure in order to provide an adequate plug for a pipe having high fluid pressure therein. Another attempted solution is found in the patent to Hosking Ser. No. 2,843,154 issued in 1958 and entitled "Expansible Plug for Pipes." However, this device has the limitation of being useable only in conjunction with valves which may be fully opened. This said plugging device is completely unuseable with non-fully opening valves such as butterfly valves and the like.

SUMMARY OF THE INVENTION

The present invention contemplates a novel expandable pipe plugging tool which is designed and constructed for overcoming the above disadvantages. The expandable plug member for the present invention is provided with a plurality of annular grooves therearound for providing maximum sealing of the pipe with a minimum amount of expansion pressure applied thereto. The present invention is also provided with an embodiment which would permit the sealing off of pipes upstream of a non-fully opening type valve such as a butterfly valve or the like. This said embodiment can also be used with a through type fully opening valve just as well. The present invention also provides a novel sealing configuration to prevent any loss of fluid through the tool itself or the operator means thereof.

The present invention provides a simple and efficient method and means for plugging off fluid flow through a pipe upstream of a valve to facilitate maintenance or replacement of the said valve with substantially no fluid loss associated therewith.

DESCRIPTION OF THE DRAWINGS

Other and further advantageous features of the present invention will hereinafter more fully appear in connection with the detailed description of the drawings in which:

FIG. 1 is a sectional view of one embodiment of a pipe plugging tool connected to a valve and associated pipe.

FIG. 2 is a sectional view of the pipe plugging tool of FIG. 1 after the said pipe has been plugged.

FIG. 3 is an end sectional view taken along the broken line 3—3 of FIG. 2.

FIG. 4 is a sectional view of another embodiment of a pipe plugging tool for use with either full-open type valves or butterfly valves and the like.

DETAILED DESCRIPTION OF THE INVENTION

Figure 4:
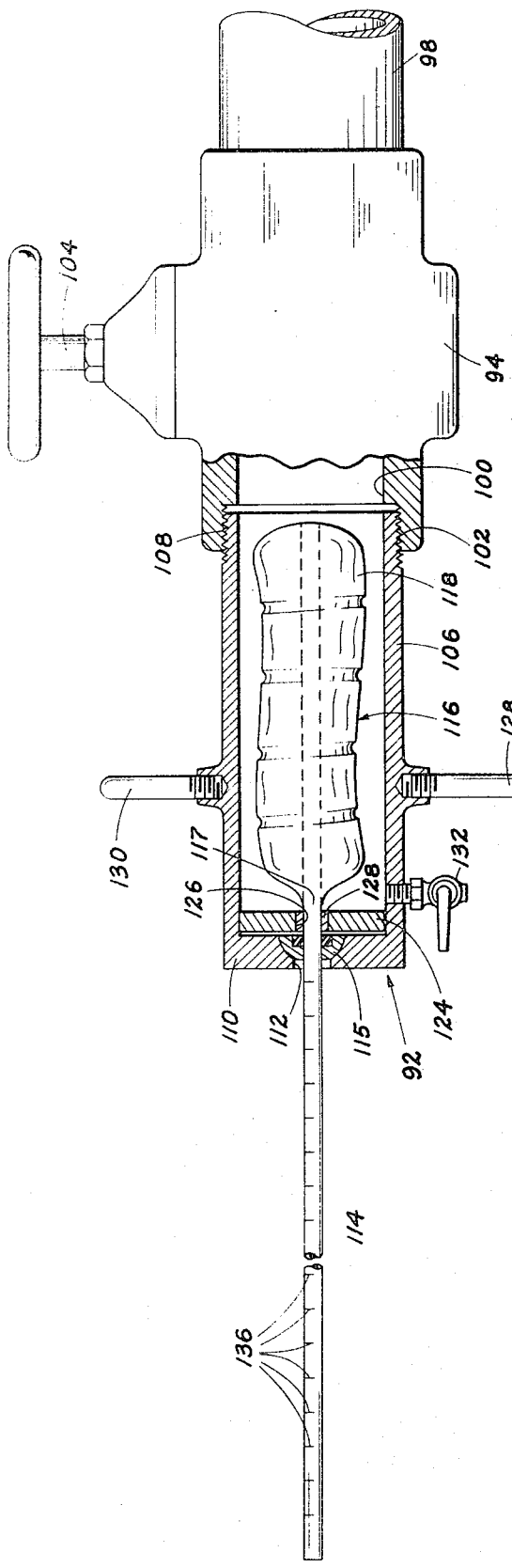

Referring to the drawings in detail, reference character 10 generally indicates an expandable pipe plugging tool for use with a fully-opening type valve generally indicated by reference character 12. The valve 12 depicts any fully-opening type through-valve having an outlet port 14 and an oppositely disposed inlet port 16. Reference character 18 indicates an operator shaft having an operator turnhandle 20 secured thereto to facilitate opening and closing of the said valve 12. The inlet port 16 of the valve 12 is depicted in FIG. 1 as being threadedly secured to a pipe 22 containing a fluid medium (not shown) under pressure therein. The outlet port 14 of the valve 12 is provided with internal threading 24 about the inside periphery thereof.

The pipe plugging tool 10 conprises a pipe section 26 having one end thereof open with a plurality of threads 28 around the outer periphery thereof, the opposite end thereof being provided with a plate 30 having a centrally disposed aperture 32 therethrough. An elongated hollow tool rod 34 is slidably disposed through the aperture 32 of the pipe section 26. A suitable annular seal member 36 is interposed between the aperture 32 of the pipe section 26 and the tool rod 34 for sealing the interior of the pipe section 26 while still permitting reciprocal movement of the tool rod 34 through the aperture 32.

An expandable plug member 38 is disposed within the pipe section 26 and secured to one end of the tool rod 34 in a manner that will be hereinafter set forth. The plug member 38 comprises a substantially cylindrical plug 40 having a plurality of spaced annular grooves 42 around the outer periphery thereof. One end of the plug 40 is provided with a disc-shaped retaining plate 44 in contact therewith. The opposite end of the plug 40 is provided with a similar disc-shaped retaining plate 46 in contact therewith. The diameter of the plug 40 is constructed to be slightly smaller than the inside diameter of the pipe section 26 when the said plug member is in a relaxed state as shown in FIG. 1, whereas the diameter of the retaining plate 44 and 46 is slightly smaller than that of the plug 40 but substantially equal to the diameter of the annular grooves 42 about the outer periphery of the plug 40. The tool rod 34 is provided with a plate member 48 at one end thereof, the said plate member 48 being provided with a centrally disposed aperture 50 therethrough. The opposite end of the tool rod 34 is provided with a similar end plate 52 having a centrally disposed aperture 54 therein. The plug 40 is provided with a centrally disposed longitudinal bore 56 therethrough and the retainer plate 46 is provided with a similar centrally disposed aperture 58 therethrough in alignment with the bore 56 of the plug 40.

An elongated operator rod 60 is centrally disposed within the tool rod 34, one end thereof being slidably disposed within the aperture 54 of the end plate 52, the opposite end thereof being slidably disposed within the aperture 50 of the end plate 48 of the tool rod 34. A suitable O-ring seal 62 is disposed around the inner periphery of the aperture 50 of the end plate 48 to provide a fluid seal between the operator rod 60 and the interior of the tool rod 34 while still permitting reciprocal movement of the said tool rod 60 through the aperture 50 of the tool rod 34. One end of the operator rod 60 is slidably disposed through the aperture 58 of the retaining plate 46 and the bore 56 of the plug 40, the end of the said operator rod 60 being rigidly secured to the retainer plate 44 in any well known manner. The opposite end of the operator rod 60 which extends outwardly through the aperture 54 of the tool rod 34 is provided with a plurality of threads 64 thereabout. The threaded end 64 of the operator rod 60 is journalled within a suitable take-up nut 66 having a threaded bore 67 therein whereby reciprocation of the operator rod 60 within the tool rod 34 may be affected by rotation of the take-up nut 66. A suitable thrust washer 68 is interposed between the take-up nut 66 and the end plate 52 of the tool rod 34 for ease of rotation of the said take-up nut 66 with respect to the said tool rod 34.

The outer side of the retaining plate 44 may be provided with a plurality of outwardly extending strengthening web members 70 thereabout to prevent bending of the said retainer plate 44 when the plug 40 is expanded as will be hereinafter set forth. A pair of disc-shaped guide plates 72 and 74 are secured within the pipe section 26 adjacent to the end plate 30 thereof. A pair of centrally disposed aligned apertures 76 and 78 are provided within the guide plates 72 and 74, respectively, each of the said apertures 76 and 78 being provided with annular brushing members 80 and 82, respectively. The tool rod 34 is slidably disposed through these bushing members 80 and 82 to provide alignment of the said tool rod 34 within the pipe section 26. It is readily apparent that these alignment bushings also serve to relieve the seal member 36 of any angular pressure that might be exerted thereon in the absence of the alignment plates 72 and 74.

The outer periphery of the pipe section 26 is provided with a pair of oppositely disposed outwardly extending handle members 84 and 86 to facilitate installation of the pipe plugging tool to the valve 12 as will be hereinafter set forth. A drain valve 90 is also provided within the wall of the pipe section 26 for draining fluid contained in the pipe section for purposes that will be hereinafter set forth.

In operation when it becomes necessary to remove the valve 12 from the pipe 22 for maintenance of the said valve or replacement thereof, the said valve 12 is operated to a closed position and the pipe plugging tool 10 is secured to the outlet port of the valve 12 by threadedly attaching the pipe section 26 of the tool 10 to the outlet port threads 24 of the valve 12. The valve 12 is then operated to a full open position and the plugging member 38 is pushed through the open valve by means of the tool rod 34 until the said plugging member 38 is at a position upstream of the valve within the pipe 22. The outer periphery of the tool rod 34 is provided with a plurality of spaced measuring graduations 91 so that it will be easy for the operator thereof to ascertain when the said plug member 38 is beyond the valve 12 and fully within the pipe 22 attached thereto. The take-up nut 66 is then rotated thereby pulling the operator rod 60 within the said take-up nut 66. Simultaneously therewith it is readily seen that the retainer plate 44 which is secured to the opposite end of the operator rod 60 will be pulled toward the retainer plate 46 thereby compressing the plug 44 causing expansion thereof outwardly against the inner walls of the pipe 22 thereby shutting off any fluid flow therethrough. The plurality of annular grooves 42 will be compressed outwardly against the inside walls of the pipe 22 thereby providing a gripping action to prevent subsequent blowing out of the plug member 38 by fluid pressure in the pipe 22 upstream of the valve 12. At this point the trapped fluid downstream from the plug member 38 within the pipe 22, the valve 12 and the pipe section 26 may be drained into a suitable container (not shown) by means of the drain valve 90. The drain valve 90 will also serve as a check to determine whether or not a proper seal has been obtained by the plugging member 38 within the pipe 22.

The valve 12 and the pipe section 26 may then be unscrewed from the pipe 22 and removed by sliding the said valve 12 and the pipe section 26 off the tool rod 34 leaving the said tool rod 34 and plug member 38 installed in the pipe 22. Reinstallation of the new or repaired valve 12 may be accomplished by threadedly attaching the pipe section 26 to the outlet port 14 of the valve 12 and then sliding the valve 12 and attached pipe section 26 over the tool rod 34 and subsequently threadedly attaching the inlet port 16 of the valve to the pipe 22. The take-up nut 66 is then rotated to extend the operator rod 60 within the tool rod 34 thereby relieving the compression on the plug 40 which in turn disengages the outer periphery of the said plug 40 with the inner walls of the pipe 22 allowing fluid to pass therearound into the valve and the pipe section 26. The said plug member 38 is then retracted through the valve by means of the tool rod 34 until the plug retainer plate 46 is adjacent to the alignment plate 78. The valve 12 is then rotated to a fully closed position and the fluid contained within the outlet port 14 of the valve 12 and the pipe section 26 is drained by means of the rain valve 90. Again, this step provides a check to insure that the valve is seating properly thereby closing off fluid flow therethrough. The pipe plugging tool 10 may then be removed from the outlet port 14 of the valve 12 and is ready for subsequent use. Care should be taken when the pipe section 26 is installed in the tool rod 34 to preclude damage of the seal 36 within the aperture 32 of the said pipe section 26.

Referring now to FIG. 4, reference character 92 generally indicates a pipe plugging tool which may be used to facilitate maintenance or replacement of a valve 94 which may be either a full-open type valve similar to the valve 12 hereinbefore described or a non-fully opening, butterfly type valve or the like. The said valve 94 is provided with an inlet port 96 which is secured to a pipe 98 having fluid disposed therein under pressure. The valve is also provided with an outlet port 100 having suitable threads 102 disposed about the inner periphery thereof. The said valve 94 is provided with an operator means 104 for opening and closing said valve. The pipe plugging tool 92 is provided with a pipe section 106 having one end thereof open and being provided with a plurality of threads 108 around the outer periphery thereof. The opposite end of the pipe section 106 is provided with a plate 110 having a centrally disposed aperture 112 therein. An elongated hollow tool rod 114 is slidably disposed within the aperture 112 of the pipe section 106, the said aperture 112 being provided with a sealing means 115 for preventing fluid flow between the said aperture 112 and the tool rod 114 while allowing reciprocal movement of the said tool rod 114 through the aperture 112.

Figure 5:
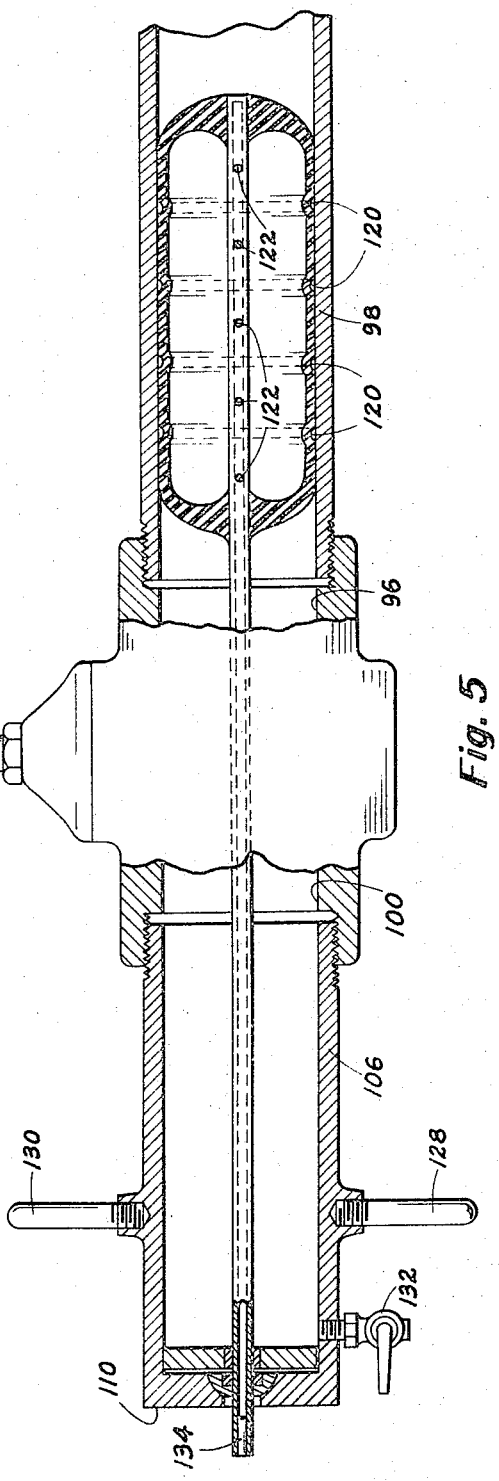
FIG. 5 is a sectional view of the pipe plugging tool of FIG. 4 after the pipe has been plugged.

An expandable plug member 116 is secured to the end of the tool rod 114 which extends into the pipe section 106. The plug member 116 comprises an elongated inflatable plug 118 which assumes a substantially cylindrical shape when inflated and is provided with a plurality of spaced angular grooves 120 around the outer periphery thereof. One end of the inflatable plug 118 is secured directly to the end of the tool rod 114 in any well known manner such as direct molding. The opposite end of the inflatable plug 116 is secured to the tool rod 114 at point 117 spaced a distance from the end of the said tool rod 114 corresponding to the approximate length of the said inflatable plug 116 in any well known manner such as by direct molding, clamps (not shown) or the like. Referring to FIG. 5, the inflatable plug 118 is constructed with thicker material at each end thereof to prevent excessive bulging of the said inflatable plug 118 upon inflation thereof. The portion of the tool rod 114 which is encompassed by the inflatable plug 118 is provided with a plurality of spaced apertures 122 therealong for purposes that will be hereinafter set forth.

The pipe section 106 may be provided with at least one removable alignment plate 124 secured therein adjacent to the end plate 110. The said alignment plate 124 is provided with an aperture 126 therein, the said aperture being provided with an annular bushing 128 for slidably receiving the tool rod 114 therethrough. It is noted that the alignment plate 124 will be provided in the pipe section 106 only when operation of the tool 92 is in conjunction with a fully opening type valve. When using the plugging tool 92 with a non-fully opening valve such as a butterfly valve, the plate 124 will not be installed and the seal 115 provided in the aperture 112 will be a universal type seal, as shown, allowing some angular movement of the tool rod 114 within the aperture 112 to allow guiding the non-inflated plug 118 through the said valve 94 and into the attached pipe member 98.

The pipe section 106 is provided with a pair of oppositely disposed outwardly extending handle members 128 and 130 to facilitate the attachment of the pipe section 106 to the outlet port 100 of the valve 94. The pipe section 106 is also provided with a drain valve 132 which is in open communication with the interior of the said pipe section 106. The end of the tool rod 114 which extends outside of the pipe section 106 is provided with either a spring-loaded normally closed valve or check valve member 134 which is recessed within the said tool rod 114. The valve member 134 may be of any suitable type for the acceptance of fluid under high pressure therethrough, the only restriction being that the said valve 134 must be capable of being fully installed within the tool rod 114 so that the pipe section 106 may be slidably removed over the end of the tool rod 114 without any obstruction thereto.

In operation, the removal or replacement of the valve 94 may be accomplished by first fully closing the said valve 94 by way of the operator means 104 and securing the plugging tool 92 to the outlet port 100 of the pipe section 94, the said inflatable plug 118 being deflated and fully retracted within the pipe section 106. The valve 94 may then be open to its most open position and the deflated plug is pushed through the valve by means of the tool rod 114 and into the attached pipe 98. As hereinbefore set forth, it may be necessary to provide some angular movement of the tool rod 114 in order to push the deflated plug member 118 past a butterfly gate (not shown) or the like, which is provided within the valve 94. It is also noted that the tool rod 114 is provided with a plurality of spaced measuring graduations 136 to aid the operator in determining when the said plug 118 is completely through the valve and wholly contained within the pipe 98. The plug 118 may then be inflated by attachment of a high pressure fluid source (not shown) to the valve 134 at the end of the tool rod 114. This high pressure source may be either pneumatic or hydraulic, the fluid being passed under pressure through the tool rod 114, and the apertures 122 which are located within the expandable plug 118 thereby fully inflating the plug 118 so that the outer periphery thereof is in sealing contact with the inner walls of the pipe 98. It is noted that the plurality of annular grooves 120 extending around the plug 118 will provide a gripping action against the inner walls of the pipe 98 thereby providing a tight seal and a strong resistance to being blown out by high pressure in the pipe 98 upstream of the plug 118.

The fluid contained downstream of the plug member 118 may then be drained by means of the drain valve 132 located on the pipe section 106. This draining operation also serves as a check to insure that the plug 118 is properly seated within the pipe 98. The pipe section 106 and the valve 94 may then be removed from the pipe 98 leaving the plug 118 and the tool operator 114 installed within the pipe 98. Replacement of the valve 94 may be accomplished by opening the said valve 94, sliding it along the tool rod 114 and connecting the inlet port 96 thereof to the pipe 98. The pipe section 106 may then be installed on the tool rod 114, care being taken not to damage the seal 115 thereof, and then threadedly attached to the outlet port 100 of the valve 94. The plug 118 may then be deflated by relieving pressure therein through the valve 134. The plug 118 may then be withdrawn through the valve 94 and retracted into the pipe section 106. The valve 94 may then be closed and the fluid contained downstream of the valve within the outlet port 100 and the pipe section 106 may then be drained by means of the drain valve 132. Again this draining step serves also to check proper seating of the valve 94. The plugging tool 92 may then be removed from the outlet port of the valve 94 and is ready for subsequent use.

From the foregoing, it will be apparent that the present invention provides a pipe plugging method and tool particularly designed and constructed for facilitating the maintenance or replacement of a valve with substantially no fluid loss associated therewith. The novel pipe plugging method and tool is simple and efficient in operation and economical and durable in construction.

Whereas the present invention has been described in particular relation to the drawings attached hereto, it should be understood that other and further modifications, apart from those shown or suggested herein, may be made within the spirit and scope of this invention. For example, the pipe sections 26 or 106 may be provided with a flange-type attachment (not shown) for use with valve outlet ports or pipe sections having flange attachment means at the end thereof.

What is claimed is:

1. An expandable pipe plugging tool for plugging off fluid flow through a pipe upstream of a valve, the pipe plugging tool comprising a pipe section having one open end, the opposite end thereof being closed, a drain valve providing communication between the inside of the pipe section and the outside of the pipe section, a coupling attached to the open end of the pipe section providing for attachment of the pipe section to the valve, said pipe section having a centrally disposed aperture in the closed end thereof, an elongated hollow tool rod slidably disposed within the aperture, sealing means interposed between the aperture and the tool rod, at least one alignment bushing secured within the pipe section adjacent to the closed end thereof, said tool rod being in sliding engagement with the bushing for alignment of said tool rod with respect to the pipe section and for the prevention of angular pressure being applied to said sealing means, an expandable cylindrical plug of resilient material secured to one end of the tool rod and slidably disposed within the pipe section, said plug having a plurality of spaced annular grooves around the outer periphery thereof and a longitudinal centrally disposed bore therethrough, and an operator means operably connected between the expandable plug and the opposite end of the tool for selective radial expansion and contraction of the plug, said operator means including an elongated operator rod slidably disposed within the tool rod and the expandable plug bore, a first disc-shaped retainer plate rigidly secured to one end of the operator rod for retaining the plug thereon, a second disc-shaped retainer plate having a centrally disposed aperture therein, said second retainer plate being slidably disposed on the operator rod between the opposite end of the plug and one end of the tool rod, a seal interposed between the tool rod and the operator rod to prevent passage of fluid therebetween, and a take-up operably connected to the operator rod on the end opposite the expandable plug which provides for reciprocal motion of the operator rod within the tool rod and within the takeup, said take-up comprising an elongated cylindrically shaped take-up nut having a centrally disposed threaded bore therethrough, a thrust washer, and a plurality of corresponding threads on the end portion of the operator rod on the end opposite the expandable plug, said end portion of the operator rod being threadedly journalled within the take-up nut with the thrust washer being disposed about the operator rod and interposed between the take-up nut and the end of the tool rod; whereby, upon rotation of the take-up nut in one direction relative to the operator rod, the end of the operator rod opposite the take-up nut will be moved in a longitudinal direction away from the thrust washer, and upon rotation of the take-up nut in the opposite direction relative to the operator rod, the end of the operator rod opposite the take-up nut will be moved in a longitudinal direction toward the thrust washer; and whereby the coupling may be attached to the valve, the expandable plug passed through the valve into the pipe upstream of the valve, the operator rod retracted within the take-up to move the first disc-shaped retainer plate closer to the second disc-shaped retainer plate and thereby longitudinally compress the expandable plug to effectuate an expansion in the diameter of the outer periphery of the expandable plug to close off the pipe upstream of the valve, and the drain valve opened to bleed pressure from the valve and to determine the completeness of the seal of the expandable plug in the upstream pipe, thereby permitting the removal of the pipe section and the valve while leaving the expandable plug and the tool rod in place to facilitate maintenance or replacement of the valve with substantially no fluid loss.

2. An expandable pipe plugging tool as set forth in claim 1 wherein a pair of oppositely disposed outwardly extending handle members are rigidly secured to the pipe section to facilitate coupling the pipe section to the valve.

3. An expandable pipe plugging tool for plugging off fluid flow through a pipe upstream of a valve, the pipe plugging tool comprising a pipe section having an open end, the opposite end thereof being closed, a drain valve providing communication between the inside of the pipe section and the outside of the pipe section, a coupling attached to the open end of the pipe section providing for attachment of the pipe section to the valve, said pipe section having a centrally disposed aperture in the closed end thereof, an elongated hollow tool rod slidably disposed within the aperture, a seal interposed between the aperture and the tool rod, an expandable plug secured to one end of the tool rod and slidably disposed within the pipe section, said expandable plug comprising an elongated inflatable plug surrounding a portion of the one end of the tool rod, the said plug being secured to the tool rod at each end of the said plug, the said plug having a substantially cylindrical shape when inflated and being provided with a plurality of spaced annular grooves around the outer periphery thereof, the said tool rod having a plurality of spaced apertures therein in open communication with the interior of the inflatable plug, the opposite end of the tool rod being provided with a normally closed valve for admission of fluid pressure therethrough to expand the inflatable plug, whereby the coupling may be attached to the valve, the expandable plug passed in deflated condition through the valve into the pipe upstream of the valve, the said plug inflated by applying fluid pressure through the normally closed valve thereby sealing off the pipe upstream of the said valve, and the drain valve opened to bleed pressure from the valve and to determine the completeness of the seal of the expandable plug in the upstream pipe, thereby permitting the removal of the pipe section and the valve while leaving the expandable plug and the tool rod in place to facilitate maintenance or replacement of the valve with substantially no fluid loss.

4. An expandable pipe plugging tool as set forth in claim 3 wherein the inflatable plug is attached at either end thereof to the tool rod by molding the said plug to the rod.

5. An expandable pipe plugging tool as set forth in claim 4 wherein each end of the plug is provided with thicker material than the side portions thereof to limit bulging of the said inflatable plug when inflated.

6. An expandable pipe plugging tool for plugging off fluid flow through a pipe upstream of a valve, the pipe plugging tool comprising: a pipe section having one open end, the opposite end thereof being closed; a coupling attached to the open end of the pipe section providing for attachment of the pipe section to the valve; said pipe section having a centrally disposed aperture in the closed end thereof; an elongated hollow tool rod slidably disposed within the aperture; a seal interposed between the aperture and the tool rod; an alignment bushing secured to the interior of the pipe section adjacent to the closed end thereof for providing alignment of the tool rod within the pipe section to relieve the seal of any angular pressures which might be exerted thereon by the tool rod; an elongated inflatable plug surrounding a portion of the end of the tool rod, said plug being secured to the tool rod at each end of the plug, the plug having a substantially cylindrical shape when inflated and being provided with a plurality of spaced annular grooves around the outer periphery thereof; a plurality of spaced apertures on the portion of the tool rod enclosed by the elongated inflatable plug providing communication between the interior of the tool rod and the interior of the inflatable plug; and a valve on the end of the tool rod on the end opposite the inflatable plug providing for the admission of fluid pressure therethrough to expand the inflatable plug; whereby, after moving the deflated plug through the valve and into the pipe upstream of the valve, the inflatable plug may be selectively inflated by applying fluid pressure through the valve on the end of the tool rod to seal off the pipe upstream of the valve or deflated by operation of the same valve to unseal and remove the inflatable plug from the pipe.

* * * * *